United States Patent
Ikura et al.

(10) Patent No.: US 10,125,530 B2
(45) Date of Patent: Nov. 13, 2018

(54) POWER WINDOW DEVICE

(71) Applicants: MITSUBISHI JIDOSHA KOGYO KABUSHIKI KAISHA, Tokyo (JP); MITSUBISHI JIDOSHA ENGINEERING KABUSHIKI KAISHA, Okazaki-shi, Aichi (JP)

(72) Inventors: Yoko Ikura, Okazaki (JP); Eiji Sato, Miyoshi (JP); Kazuhiko Matsuba, Nagoya (JP); Takafumi Yamazaki, Okazaki (JP); Wataru Akatsuka, Anjo (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Okazaki-Shi, Aichi (JP)

( * ) Notice: Subject to any disclaimer, the term of this patent is extended or adjusted under 35 U.S.C. 154(b) by 357 days.

(21) Appl. No.: 14/981,356

(22) Filed: Dec. 28, 2015

(65) Prior Publication Data
US 2016/0186478 A1    Jun. 30, 2016

(30) Foreign Application Priority Data

Dec. 26, 2014 (JP) ................................. 2014-264689
Dec. 26, 2014 (JP) ................................. 2014-264690

(51) Int. Cl.
| | | |
|---|---|---|
| E05F 15/20 | (2006.01) | |
| E05F 15/60 | (2015.01) | |

(Continued)

(52) U.S. Cl.
CPC ................. *E05F 15/60* (2015.01); *B60J 1/17* (2013.01); *E05F 15/695* (2015.01); *E05F 15/79* (2015.01); *E05Y 2900/55* (2013.01)

(58) Field of Classification Search
CPC . E05F 15/60; E05F 15/41; E05F 15/79; E05F 15/431; E05F 15/695; E05F 15/689;
(Continued)

(56) References Cited

U.S. PATENT DOCUMENTS 4,328,451 A * 5/1982 Barge ...................... H02P 7/03
                                                    318/265
4,773,183 A * 9/1988 Okushima ................ F16P 3/12
                                                    49/28

(Continued)

FOREIGN PATENT DOCUMENTS

| DE | 20 2005 017204 U1 | 3/2007 |
|---|---|---|
| JP | 59-062014 | 4/1984 |

(Continued)

OTHER PUBLICATIONS

Extended European Search Report dated May 24, 2016 in correspondnig European Application No. 15201973.3.
(Continued)

*Primary Examiner* — Chi Q Nguyen
(74) *Attorney, Agent, or Firm* — Birch, Stewart, Kolasch & Birch, LLP

(57) ABSTRACT

A power window device includes a driving unit which moves a plurality of window glasses of a vehicle respectively, an operation unit which has a plurality of switches corresponding to the plurality of window glasses and which is provided for driving the driving unit, and a control unit which controls the driving unit to move and open or close the window glasses in accordance with an operation on the operation unit. When a normal operation for operating any one of the plurality of window switches individually is performed, the control unit controls the driving unit to move only the window glass corresponding to the operated window switch. When a special operation which is different from the normal operation is performed on the window (Continued)

switches, the control unit controls the driving unit to move all the window glasses.

19 Claims, 3 Drawing Sheets

(51) Int. Cl.
  *E05F 15/695* (2015.01)
  *E05F 15/79* (2015.01)
  *B60J 1/17* (2006.01)
(58) Field of Classification Search
  CPC ......... E05Y 2400/542; E05Y 2400/512; E05Y 2400/612; E05Y 2900/55; B60J 1/17
  USPC ....................................... 49/29, 138, 349, 28
  See application file for complete search history.

(56) References Cited

U.S. PATENT DOCUMENTS

| | | | |
|---|---|---|---|
| 5,537,013 A | 7/1996 | Toyozumi et al. | |
| 6,541,929 B2* | 4/2003 | Cregeur | E05F 15/689 160/291 |
| 9,657,508 B2* | 5/2017 | Koizumi | E05F 15/697 |
| 2005/0052082 A1* | 3/2005 | Noro | E05F 15/695 307/10.1 |
| 2007/0169418 A1* | 7/2007 | Noro | E05F 15/42 49/502 |
| 2008/0110092 A1* | 5/2008 | Takahashi | E05F 15/41 49/28 |
| 2009/0007493 A1* | 1/2009 | Hohn | B60J 7/0573 49/349 |
| 2010/0332086 A1* | 12/2010 | Zhao | E05F 15/695 701/49 |
| 2016/0186478 A1* | 6/2016 | Ikura | E05F 15/60 49/29 |
| 2017/0268279 A1* | 9/2017 | Campagnolo | E05F 15/70 |

FOREIGN PATENT DOCUMENTS

| | | |
|---|---|---|
| JP | 5-76824 U | 10/1993 |
| JP | H06-081540 | 3/1994 |
| JP | 06-343279 A | 12/1994 |
| JP | H11-159243 A | 6/1999 |
| JP | 2004-116051 A | 4/2004 |
| JP | 2012-122233 A | 6/2012 |
| JP | 5402883 B2 | 1/2014 |

OTHER PUBLICATIONS

Japanese Office Action of JP 2014-264689 dated Sep. 11, 2018.
Japanese Office Action of JP 2014-264690 dated Sep. 11, 2018.

* cited by examiner

POWER WINDOW DEVICE

BACKGROUND

The present invention relates to a power window device mounted in a car.

In a car, window glasses which can be opened/closed are provided and a power window device which opens/closes the window glasses using driving sources such as electric motors are mounted. Power window switches are provided in the power window device. When the power window switches are operated, the driving sources are driven so that the window glasses are opened/closed by powers of the driving sources (e.g. see Japanese Patent No. 5402883 and JP-UM-A-5-76824).

For example, in the car in which the window glasses disposed on a driver's seat side, an assistant driver's seat side, a rear right seat side and a rear left seat side of a vehicle respectively can be opened/closed, the power window switches for opening/closing the window glasses are provided in the vicinities of the window glasses respectively. Here, the power window switches in the vicinities of the window glasses disposed on the assistant driver's seat side, the rear right seat side and the rear left seat side are window switches for opening/closing the corresponding window glasses respectively. The window power switch in the vicinity of the window glass disposed on the driver's seat side is provided with a plurality of window switches for opening/closing all the window glasses respectively.

Accordingly, when passengers who ride on the car and sit on the assistant driver's seat, the rear right seat and the rear left seat operate the power window switches (window switches) provided in the vicinities of the window glasses respectively, the passengers can open/close the corresponding window glasses respectively. When a driver who rides on the car and sits on the driver's seat operates the plurality of window switches of the power window switch (driver's seat power window switch) provided in the vicinity of the driver's seat window glass, the driver can open/close the respective window glasses.

In the driver's seat power window switch, the respective window switches are arranged correspondingly to the arrangement of the respective window glasses. The driver's seat window switch for opening/closing the window glass on the driver's seat side and the assistant driver's seat window switch for opening/closing the window glass on the assistant driver's seat side are disposed side by side horizontally on the left and right of a front row in the driver's seat power window switch. The rear right seat window switch for opening/closing the window glass on the rear right seat side and the rear left seat window switch for opening/closing the window glass on the rear left seat side are disposed side by side horizontally on the left and right of a rear row in the driver's seat power window switch.

However, it is difficult for the driver who is performing driving operation to operate all the window switches on the left and right of the front row and the left and right of the rear row in the driver's seat power window switch at one time. Accordingly, when the driver wants to move and open or close all the window glasses, the driver has to perform a window switch operation at least twice. For example, the driver may first operate the switches on the left and right of the front row to move and open or close the window glass on the driver's seat side and the window glass on the assistant driver's seat side, and then may operate the switches on the left and right of the rear row to move and open or close the window glasses on opposite sides of the rear seats.

Such a window switch operation is a troublesome work (operation) to the driver who is performing driving operation. Therefore, it is preferable that the window switch operation is simple.

The invention has been accomplished in consideration of the foregoing problem. An object of the invention is to simplify a window opening/closing operation in a power window device.

SUMMARY

The power window device according to a first configuration of the invention in order to solve the foregoing problem is a power window device including: a driving unit which moves a plurality of window glasses of a vehicle respectively; an operation unit which is provided for driving the driving unit; and a control unit which controls the driving unit to move and open or close the window glasses in accordance with an operation on the operation unit; wherein: the operation unit has a plurality of window switches corresponding to the plurality of window glasses; when a normal operation for operating any one of the plurality of window switches individually is performed, the control unit controls the driving unit to move only the window glass corresponding to the operated window switch; and when a special operation as a different operation from the normal operation is performed on the window switches, the control unit controls the driving unit to move all the window glasses.

The power window device according to a second configuration of the invention in order to solve the foregoing problem is a power window device according to the first configuration of the invention, wherein: the control unit controls the driving unit so that the movement of each of the window glasses caused by the special operation can be slower than the movement of the window glass caused by the normal operation.

The power window device according to a third configuration of the invention in order to solve the foregoing problem is a power window device according to the first or second configuration of the invention, wherein: the control unit controls the driving unit so that the movement of the window glass disposed on a driver's seat side of the vehicle can be faster than the movement of the window glass disposed on any other seat side of the vehicle during the movements of the window glasses caused by the special operation.

The power window device according to a fourth configuration of the invention in order to solve the foregoing problem is a power window device according to any one of the first through third configurations of the invention, further including: a notification unit which notifies each passenger of the movements of the window glasses caused by the special operation.

The power window device according to a fifth configuration of the invention in order to solve the foregoing problem is a power window device according to the fourth configuration of the invention, wherein: the control unit controls the notification unit to notify each passenger of the movements of the window glasses before the movements of the window glasses caused by the special operation are started.

The power window device according to a sixth configuration of the invention in order to solve the foregoing problem is a power window device according to any one of the first through fifth configurations of the invention, wherein: the special operation is an operation for operating at least two of the window glasses concurrently.

The power window device according to a seventh configuration of the invention in order to solve the foregoing problem is a power window device according to the first configuration of the invention, wherein: the control unit controls the driving unit to move the window glasses at different movement timings when the special operation as a different operation from the normal operation is performed on the power switches to move all the window glasses.

The power window device according to an eighth configuration of the invention in order to solve the foregoing problem is a power window device according to the seventh configuration of the invention, wherein: the control unit controls the driving unit so that the movements of the window glasses can be stopped at different timings during the movements of the window glasses caused by the special operation.

The power window device according to a ninth configuration of the invention in order to solve the foregoing problem is a power window device according to the seventh or eighth configuration of the invention, wherein: the control unit controls the driving unit to start moving the window glasses disposed in a front row of the vehicle and then start moving the window glasses disposed in a rear row of the vehicle so that the movements of the window glasses can be started at different movement timings during the movements of the window glasses caused by the special operation.

The power window device according to a tenth configuration of the invention in order to solve the foregoing problem is a power window device according to any one of the seventh through ninth configurations of the invention, wherein: the control unit controls the driving unit to start moving the window glass disposed on a driver's seat side in a front row of the vehicle and then start moving the window glass disposed on an assistant driver's seat side in the front row of the vehicle so that the movements of the window glasses can be started at different movement timings during the movements of the window glasses caused by the special operation.

The power window device according to an eleventh configuration of the invention in order to solve the foregoing problem is a power window device according to any one of the seventh through tenth configurations of the invention, wherein: the control unit controls the driving unit so that a time between start of the movement of the window glass disposed on a driver's seat side in a front row of the vehicle and start of the movement of the window glass disposed on an assistant driver's seat side in the front row of the vehicle can be longer than a time between the start of the movement of the window glass disposed on the assistant driver's seat side in the front row of the vehicle and start of the movements of the window glasses disposed in a rear row of the vehicle during the movements of the window glasses caused by the special operation.

The power window device according to a twelfth configuration of the invention in order to solve the foregoing problem is a power window device according to any one of the seventh through eleventh configurations of the invention, wherein: the special operation is an operation for operating at least two of the window switches concurrently.

The power window device according to a thirteenth configuration of the invention in order to solve the foregoing problem is a power window device according to any one of the seventh through twelfth configurations of the invention, further including: a notification unit which notifies each passenger of the movements of the window glasses caused by the special operation.

The power window device according to a fourteenth configuration of the invention in order to solve the foregoing problem is a power window device according to the thirteenth configuration of the invention, wherein: the control unit controls the notification unit to notify each passenger of the movements of the window glasses before the movements of the window glasses caused by the special operation are started.

According to the power window device according to the first configuration of the invention, it is possible to move all the window glasses by a simple operation.

According to the power window device according to the second configuration of the invention, the movement of each of the window glasses caused by the special operation is made slower than the movement of the window glass caused by the normal operation. Accordingly, it is possible to improve passenger's safety and it is possible to draw passenger's attention to the movements of the window glasses caused by the special operation.

According to the power window device according to the third configuration of the invention, the movement of the driver's seat window glass caused by the special operation is made faster than the movement of any other seat window glass. Accordingly, it is possible to reduce troublesomeness imposed on the driver due to slow movement of the driver's seat window glass while securing passenger's safety in any other seat.

According to the power window device according to the fourth configuration of the invention, the movements of the window glasses caused by the special operation are notified by the notification unit. Accordingly, it is possible to draw passenger's attention to the movements surely.

According to the power window device according to the fifth configuration of the invention, the movements of the window glasses caused by the special operation are notified by the notification unit prior to the movements of the window glasses. Accordingly, it is possible to draw passenger's attention to the movements surely.

According to the power window device according to the sixth configuration of the invention, it is possible to perform the special operation simply. In addition, it is possible to clearly make a distinction between the normal operation and the special operation. Accordingly, an operation which should be intended as the normal operation can be prevented from being regarded as a special operation, or an operation which should be intended as the special operation can be prevented from being regarded as a normal operation.

According to the power window device according to the seventh configuration of the invention, it is possible to move all the window glasses by a simple operation. In addition, the window glasses are moved at different movement timings. Accordingly, it is possible to shift timings of an overcurrent etc. flowing during motor lock in the driving unit.

According to the power window device according to the eighth configuration of the invention, the movements of the window glasses are stopped at different timings. Accordingly, it is possible to shift timings of an overcurrent etc. flowing during motor lock in the driving unit.

Accordingly, deterioration etc. in an electric system can be reduced.

According to the power window device according to the ninth configuration of the invention, the movement timings for starting the movements of the window glasses are set in the sequence of the front row window glasses and the rear row window glasses. Accordingly, it is possible to draw rear-seat passenger's attention to the movements of the window glasses caused by the special operation.

According to the power window device according to the tenth configuration of the invention, the movement timings for starting the movements of the window glasses are set in the sequence of the driver's seat window glass and the assistant driver's seat window glass. Accordingly, it is possible to draw attention of the assistant-driver's-seat passenger to the movements of the window glasses caused by the special operation.

According to the power window device according to the eleventh configuration of the invention, the difference (time) in movement timing between the start of the movement of the driver's seat window glass and the start of the movement of the assistant driver's seat window glass is made longer than the difference (time) in movement timing between the start of the movement of the assistant driver's seat window glass and the start of the movements of the rear seat window glasses. Accordingly, it is possible to draw attention of any passenger other than the driver to the movements of the window glasses caused by the special operation.

According to the power window device according to the twelfth configuration of the invention, it is possible to perform the special operation simply. In addition, it is possible to clearly make a distinction between the normal operation and the special operation. Accordingly, an operation which should be intended as the normal operation can be prevented from being regarded as a special operation, or an operation which should be intended as the special operation can be prevented from being regarded as a normal operation.

According to the power window device according to the thirteenth configuration of the invention, the movements of the window glasses caused by the special operation are notified by the notification unit. Accordingly, it is possible to draw passenger's attention to the movements surely.

According to the power window device according to the fourteenth configuration of the invention, the movements of the window glasses caused by the special operation are notified by the notification unit prior to the movements of the window glasses. Accordingly, it is possible to draw passenger's attention to the movements surely.

DETAILED DESCRIPTION OF THE EMBODIMENTS

An example of a power window device according to the invention will be described below in detail with reference to the accompanying drawings. It is matter of course that the invention is not limited to the following example but may be carried out with various changes made thereon without departing from the scope and spirit of the invention.

EXAMPLE 1

The configuration of the power window device according to Example 1 of the invention will be described with reference to FIG. 1, FIG. 3 and FIG. 4.

Figure 1:
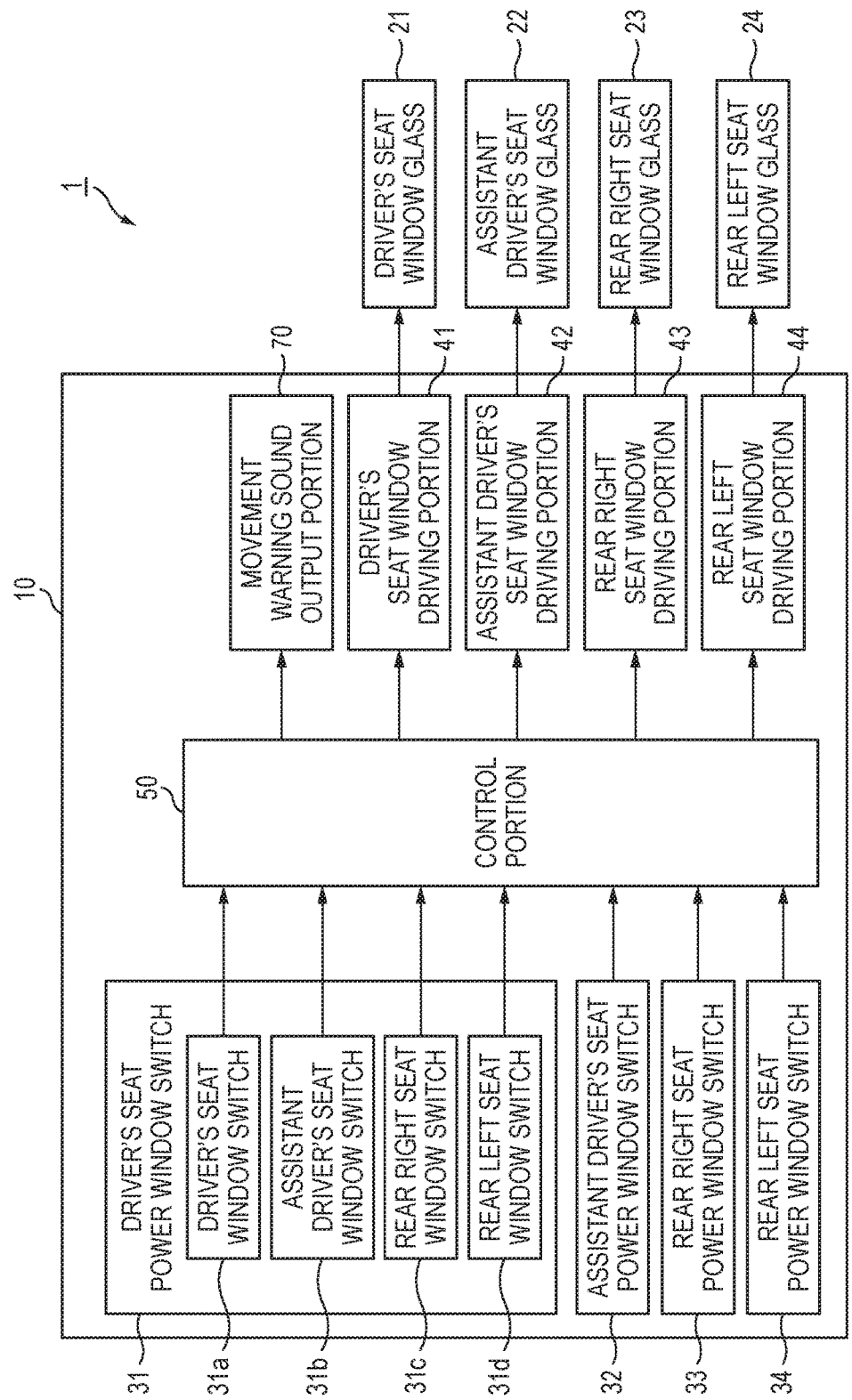
FIG. 1 is a block diagram showing configuration of a power window device according to Example 1.

As shown in FIG. 1, a power window device 10 is provided in a car 1. Window glasses (a driver's seat window glass, an assistant driver's seat window glass, a rear right seat window glass and a rear left seat window glass) 21, 22, 23 and 24 which are disposed in a driver's seat, an assistant driver's seat, a rear right seat and a rear left seat of a vehicle respectively are opened/closed by the power window device 10.

Power window switches (a driver's seat power window switch, an assistant driver's seat power window switch, a rear right seat power window switch and a rear left seat power window switch) 31, 32, 33 and 34, window driving portions (a driver's seat window driving portion, an assistant driver's seat window driving portion, a rear right seat window driving portion and a rear left seat window driving portion) 41, 42, 43 and 44, and a control portion 50 are provided in the power window device 10. The power window switches 31, 32, 33 and 34 are provided in the vicinities of the window glasses 21, 22, 23 and 24 respectively. The window driving portions 41, 42, 43 and 44 move and open/close the window glasses 21, 22, 23 and 24 respectively. The control portion 50 controls the window driving portions 41, 42, 43 and 44 in accordance with operations on the power window switches 31, 32, 33 and 34 respectively.

The power window switches 31, 32, 33 and 34 and the window driving portions 41, 42, 43 and 44 are electrically connected to the control portion 50. When one of the power window switches 31, 32, 33 and 34 is operated by a user (a driver or a passenger), information about the operation performed on the power window switch 31, 32, 33 or 34 is sent as an input signal to the control portion 50, and an instruction signal corresponding to the information about the operation performed on the power window switch 31, 32, 33 or 34 is outputted from the control portion 50 to the window driving portion 41, 42, 43 or 44.

Each of the window driving portions 41, 42, 43 and 44 has a not-shown driving source such as an electric motor. A corresponding one of the window glasses 21, 22, 23 and 24 can be moved and opened or closed (moved vertically) through a not-shown driving mechanism by power of the driving source. Based on the aforementioned instruction signal sent from control portion 50 to the window driving portion 41, 42, 43 or 44, the window driving portion 41, 42, 43 or 44 is driven to open/close (vertically move) the window glass 21, 22, 23 or 24.

Figure 3:
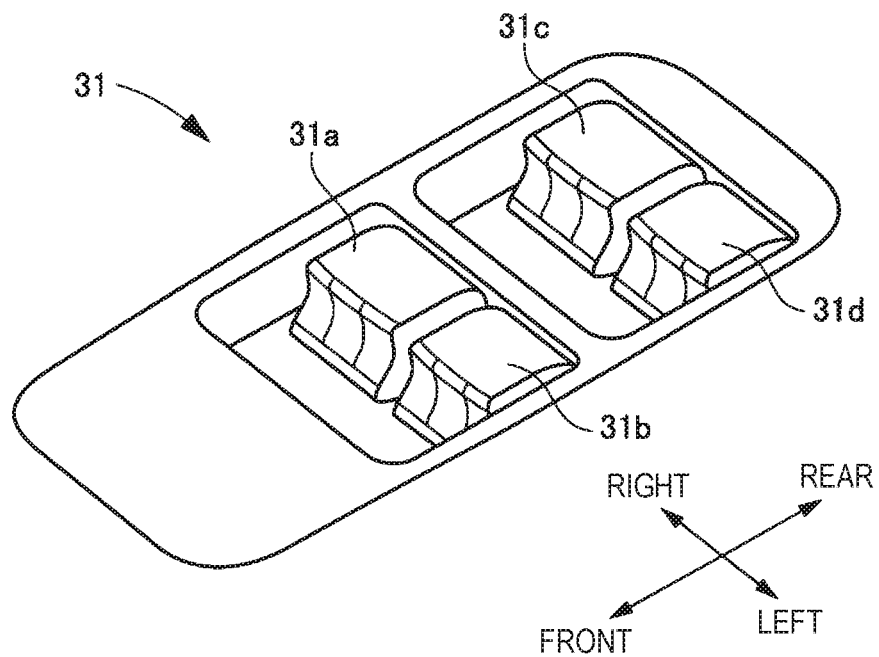
FIG. 3 is a perspective view showing a driver's seat power window switch in the power window device according to Example 1.

As shown in FIG. 1 and FIG. 3, a plurality of (four in the example of the invention) window switches (a driver's seat window switch, an assistant driver's seat window switch, a rear right seat window switch and a rear left seat window switch) 31a, 31b, 31c and 31d corresponding to the window glasses 21, 22, 23 and 24 respectively are provided in the driver's seat power window switch 31 so that the window glasses 21, 22, 23 and 24 can be also opened/closed in accordance with operations performed on these window switches 31a, 31b, 31c and 31d respectively.

The window switches 31a, 31b, 31c and 31d in the driver's seat power window switch 31 are arranged correspondingly to the arrangement of the window glasses 21, 22, 23 and 24 in the vehicle. That is, the driver's seat window switch 31a is disposed on a right side of a front row, similarly to the driver's seat in the vehicle. The assistant driver's seat window switch 31b is disposed on a left side of the front row, similarly to the assistant driver's seat in the vehicle. The rear right seat window switch 31c and the rear left seat window switch 31d are disposed respectively on a right side and a left side of a rear row, similarly to the rear seats (on the right side and the left side) in the vehicle.

Figure 4:
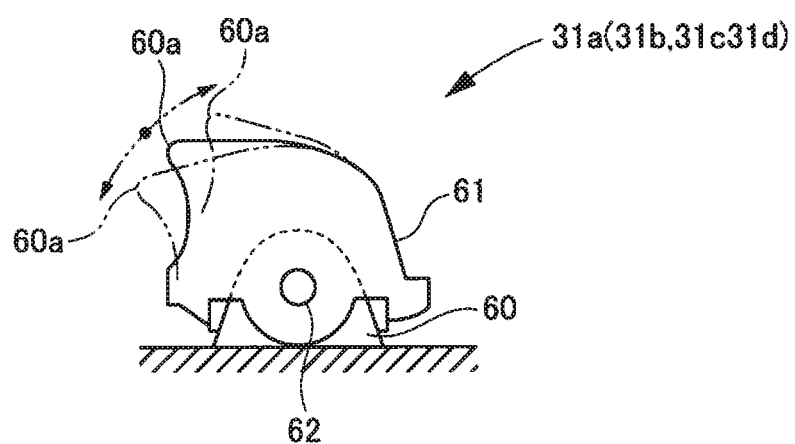
FIG. 4 is a side view showing each window switch in the power window device according to Example 1.

As shown in FIG. 4, each of these window switches 31a, 31b, 31c and 31d is constituted by a fixation portion 60 and a rotation portion 61. The fixation portion 60 is fixed to the vehicle. The rotation portion 61 is supported rotatably on the fixation portion 60. The rotation portion 61 rotates relatively to the fixation portion 60 around a rotation shaft portion 62. The window switch 31a, 31b, 31c or 31d is operated (the rotation portion 61 is rotated) so that an operation end portion 60a of the rotation portion 61 can move in the same direction as a movement direction of the window glass 21, 22, 23 or 24. In this manner, an operation signal is sent to the control portion 50 from the driver's seat power window switch 31.

That is, for moving and opening the window glass 21, 22, 23 or 24, the rotation portion 61 is rotated (rotated leftward in FIG. 4) to pull down the operation end portion 60a of the rotation portion 61. On the other hand, for moving and closing the window glass 21, 22, 23 or 24, the rotation portion 61 is rotated (rotated rightward in FIG. 4) to pull up the operation end portion 60a of the rotation portion 61.

The operation on the driver's seat power window switch 31 in the power window device 10 includes a normal operation for operating the window switches 31a, 31b, 31c and 31d individually, and a special operation for operating the window switches 31a, 31b, 31c and 31d differently from the normal operation.

When, for example, only the driver's seat window switch 31a is operated to be pulled up as the normal operation, only the driver's seat window glass 21 corresponding to the driver's seat window switch 31a is moved and closed.

When, for example, both the driver's seat window switch 31a and the assistant driver's seat window switch 31b are operated to be pulled up concurrently as the special operation, all the window glasses 21, 22, 23 and 24 are moved and closed. In the example of the invention, the movements of the window glasses 21, 22, 23 and 24 caused by the special operation are to fully open (move and open) or fully close (move and close) all the window glasses 21, 22, 23 and 24.

Incidentally, the movements of the window glasses 21, 22, 23 and 24 caused by the special operation can be stopped by a predetermined operation on at least one of the power window switches 31, 32, 33 and 34. An example of the operation for stopping the movements of the window glasses 21, 22, 23 and 24 caused by the special operation may include an operation to a direction opposite to the movement direction of the window glasses 21, 22, 23 and 24 caused by the special operation. That is, when an operation is performed for moving and closing at least one of the window glasses 21, 22, 23 and 24 during the opening movements of the window glasses 21, 22, 23 and 24, the opening movements of the window glasses 21, 22, 23 and 24 caused by the special operation are stopped. When an operation is performed for moving and opening at least one of the window glasses 21, 22, 23 and 24 during the closing movements of the window glasses 21, 22, 23 and 24, the closing movements of the window glasses 21, 22, 23 and 24 caused by the special operation are stopped.

The special operation can be clearly distinguished from the normal operation when both the driver's seat window switch 31a and the assistant driver's seat window switch 31b, i.e. at least two of the window switches 31a, 31b, 31c and 31d, are operated concurrently (concurrent operation) as the special operation as described above. It is a matter of course that the special operation in the invention is not limited to the concurrent operation as in the example of the invention.

For example, the special operation can be clearly distinguished from the normal operation when at least one of the window switches 31a, 31b, 31c and 31d is operated a number of times continuously, i.e. operated a set number of times (a predetermined number of times) within a set time (a predetermined time) (continuous operation) as the special operation. For example, all the window glasses 21, 22, 23 and 24 may be moved and closed when the driver's seat window switch 31a has been operated to be pulled up twice within 1 to 2 [sec] as the continuous operation.

In addition, the special operation can be clearly distinguished from the normal operation when at least one of the window switches 31a, 31b, 31c and 31d is operated for a set time (a predetermined time) longer than the normal operation (long time operation). For example, all the window glasses 21, 22, 23 and 24 may be moved and closed when the driver's seat window switch 31a has been operated to be pulled up for at least 2 [sec] as the long time operation.

In addition, a combination of the aforementioned operations may be used as the special operation. For example, all the window glasses 21, 22, 23 and 24 may be moved and closed when both the driver's seat window switch 31a and the assistant driver's seat window switch 31b have been operated to be pulled up for at least 300 [msec], at least 300 [msec] have passed in the state in which both the driver's seat window switch 31a and the assistant driver's seat window switch 31b are not operated (in a neutral position designated by a solid line in FIG. 4), and both the driver's seat window switch 31a and the assistant driver's seat window switch 31b have been operated to be pulled up for at least 300 [msec].

The window glasses 21, 22, 23 and 24 may be moved at different movement timings when all the window glasses 21, 22, 23 and 24 are moved due to such a special operation. For example, timings for stopping the window glasses 21, 22, 23 and 24 at fully closed (or fully opened) positions in the closing movements (or opening movements) of the window glasses 21, 22, 23 and 24 are separated (shifted) into a number of times, so that timings of an overcurrent flowing during motor lock in the window driving portions 41, 42, 43 and 44 can be shifted from one another. The movements of the window glasses 21, 22, 23 and 24 are stopped at different timings based on opening amounts (window opening amounts) of the window glasses 21, 22, 23 and 24 grasped in the window driving portions 41, 42, 43 and 44 respectively.

In addition, timings for starting the movements of the window glasses 21, 22, 23 and 24 are separated into a number of times, for example, as follows. That is, movement of the driver's seat window glass 21 is first started. Movement of the assistant driver's seat window glass 22 is then started. Movements of the rear right seat window glass 23 and the rear left seat window glass 24 are finally started. Thus, it is possible to draw passenger's attention to the movements of the window glasses 21, 22, 23 and 24 caused by the special operation.

The time between the start of the movement of the driver's seat window glass 21 and the start of the movement of the assistant driver's seat window glass 22 on this occasion is set long (for example, at three seconds). Thus, it is possible to surely draw attention of any passenger other than the driver who performed the special operation and it is possible to shift the timings of the overcurrent flowing during motor lock in the window driving portions 41, 42, 43 and 44.

In addition, the time between the start of the movement of the assistant driver's seat window glass 22 and the start of the movements of the rear right seat window glass 23 and the rear left seat window glass 24 is set short (for example, at one second). Thus, it is possible to draw passenger's attention surely and it is possible to shift the timings of the overcurrent flowing during motor lock in the window driving portions 42, 43 and 44.

In this manner, it is preferable that the time between the start of the movement of the driver's seat window glass 21 and the start of the movement of the assistant driver's seat window glass 22 is set to be longer than the time between the start of the movement of the assistant driver's seat window glass 22 and the start of the movements of the rear right seat window glass 23 and the rear left seat window glass 24 in order to draw attention of any passenger other than the driver.

In addition, the speed of the movement of each window glass 21, 22, 23 or 24 caused by the special operation is set to be different from the speed of the movement of the window glass 21, 22, 23 or 24 caused by the normal operation. The movement of the window glass 21, 22, 23 or 24 caused by the special operation is made slower than the movement of the window glass 21, 22, 23 or 24 caused by the normal operation. Thus, it is possible to improve passenger's safety. In addition, of the movements of the window glasses 21, 22, 23 and 24 caused by the special operation, the movement of the driver's seat window glass 21 is made faster than the movement of any other seat window glass (the assistant driver's seat window glass, the rear right seat window glass or the rear left seat window glass) 22, 23 or 24. Thus, it is possible to reduce troublesomeness imposed on the driver due to slow movement of the driver's seat window glass 21 while securing safety of any passenger other than the driver.

In addition, a movement warning sound output portion 70 is provided in the power window device 10 so that any passenger can be notified, in the form of movement warning sound, of the movements (opening movements or closing movements) of the window glasses 21, 22, 23 and 24 caused by the special operation on the power window switches 31, 32, 33 and 34.

The movement warning sound output portion 70 is electrically connected to the control portion 50. When the special operation is performed on the driver's seat power window switch 31 by the user (driver), information about the operation performed on the driver's seat power window switch 31 is sent as an input signal to the control portion 50. An instruction signal corresponding to the information about the operation performed on the driver's seat power window switch 31 is outputted from the control portion 50 to the movement warning sound output portion 70 before an instruction signal is outputted from the control portion 50 to the window driving portions 41, 42, 43 and 44. Thus, movement warning sound (notification sound) for warning the movements of the window glasses 21, 22, 23 and 24 caused by the special operation can be generated from the movement warning sound output portion 70.

In this manner, the movement warning sound is generated (outputted) from the movement warning sound output portion 70 before the movements of the window glasses 21, 22, 23 and 24 caused by the special operation are started. Thus, it is possible to draw passenger's attention to the movements.

Incidentally, setting of the aforementioned different movement timings and a time difference therebetween, setting of the movement speeds, and the output timing of the movement warning sound etc. can be performed by a not-shown instrument setup tool or a not-shown navigation system.

The movements caused by the special operation in the power window device according to Example 1 of the invention will be described with reference to FIG. 1 and FIG. 2.

Figure 2:
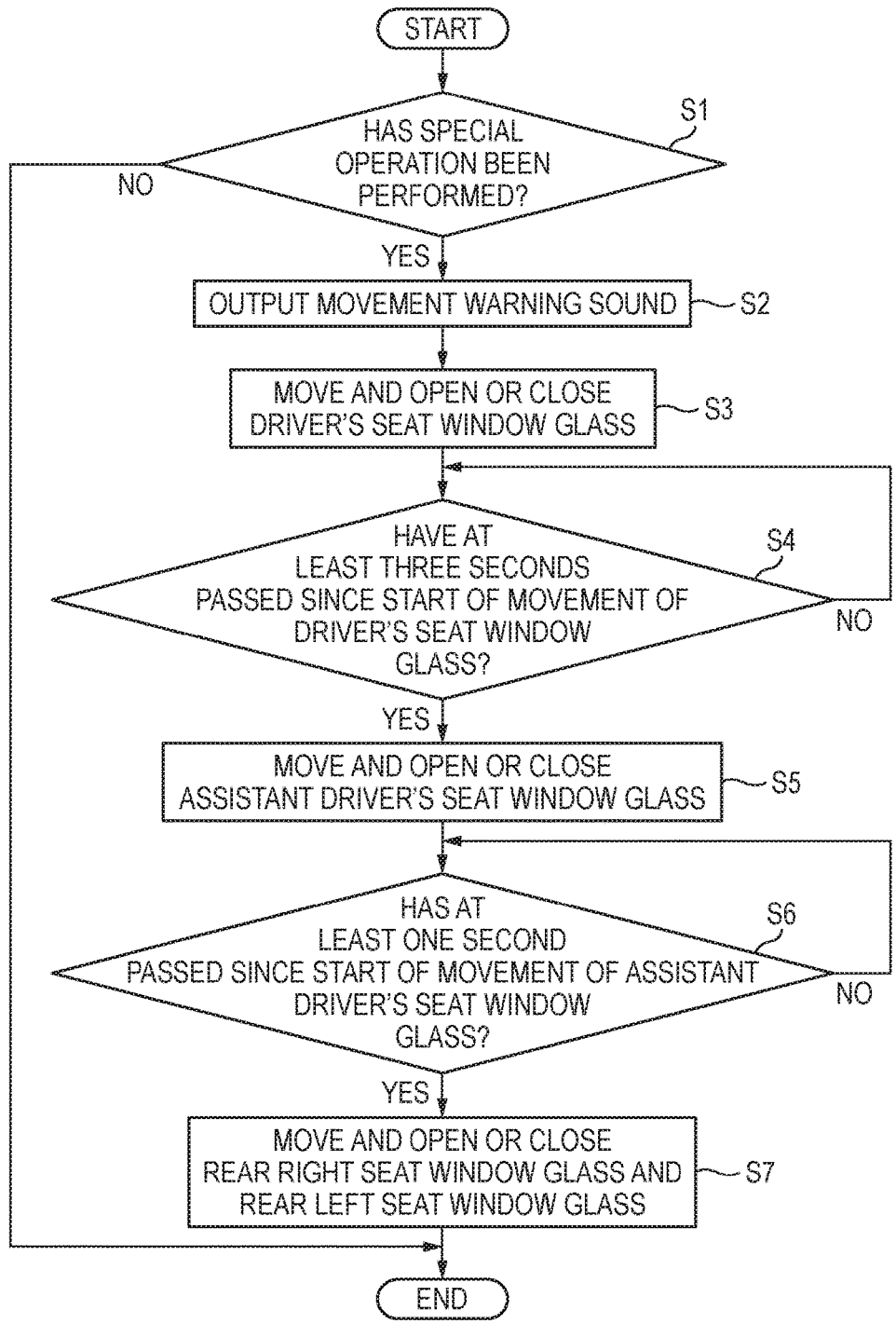
FIG. 2 is a flow chart showing movement of the power window device according to Example 1.

FIG. 2 shows a flow of the movements when the time between the start of the movement of the driver's seat window glass 21 and the start of the movement of the assistant driver's seat window glass 22 is set at three seconds and the time between the start of the movement of the assistant driver's seat window glass 22 and the start of the movements of the rear right seat window glass 23 and the rear left seat window glass 24 is set at one second. Incidentally, the time intervals shown in FIG. 2 are simply exemplified. The invention is not necessarily limited thereto.

As shown in FIG. 2, when a special operation is performed in a step S1, movement warning sound is outputted in a step S2. Then, the driver's seat window glass 21 is moved and opened or closed in a step S3.

That is, the special operation in the driver's seat power window switch 31 is performed, for example, in such a manner that two seat window switches on the right and the left of the front row (i.e. the driver's seat window switch 31a and the assistant driver's seat window switch 31b) or two seat window switches on the right and the left of the rear row (i.e. the rear right seat window switch 31c and the rear left seat window switch 31d) are operated concurrently twice continuously. Thus, an operation signal of the special operation is sent to the control portion 50. An instruction signal is outputted from the control portion 50 to the movement warning sound output portion 70 so that movement warning sound (notification sound) can be generated in the movement warning sound output portion 70. Then, an instruction signal for opening movement or closing movement is outputted from the control portion 50 to the driver's seat window driving portion 41, so that the driver's seat window driving portion 41 can be driven to move the driver's seat window glass 21.

In this manner, the movement warning sound (notification sound) is generated from the movement warning sound output portion 70 prior to the movement of the driver's seat window glass 21, i.e. prior to the movements of all the window glasses 21, 22, 23 and 24. Accordingly, it is possible to draw passenger's attention to the movement caused by the special operation. In addition, since the driver's seat window glass 21 is moved in the beginning, it is possible to draw passenger's attention to the movement caused by the special operation.

Next, when at least three seconds pass since the start of the movement of the driver's seat window glass 21 in a step S4, the assistant driver's seat window glass 22 is moved and opened or closed in a step S5.

That is, in accordance with the instruction of the control portion 50, the driver's seat window driving portion 41 is driven to move the driver's seat window glass 21. After at least three seconds have passed since the start of the movement of the driver's seat window glass 21, an instruction signal for opening movement or closing movement is outputted from the control portion 50 to the assistant driver's seat window driving portion 42. In accordance with the instruction of the control portion 50, the assistant driver's seat window driving portion 42 is driven to move the assistant driver's seat window glass 22.

In this manner, the movement of the assistant driver's seat window glass 22 is started after at least three seconds have passed since the start of the movement of the driver's seat window glass 21. Accordingly, it is possible to improve passenger's safety and it is possible to shift timings of an overcurrent flowing during motor lock in the window driving portions 41, 42, 43 and 44.

Next, when at least one second passes since the start of the movement of the assistant driver's seat window glass 22 in a step S6, the rear right seat window glass 23 and the rear left seat window glass 24 are moved and opened or closed in a step S7.

That is, in accordance with the instruction of the control portion 50, the assistant driver's seat window driving portion 42 is driven to move the assistant driver's seat window glass 22. After at least one second has passed since the start of the movement of the assistant driver's seat window glass 22, an instruction for opening movement or closing movement is outputted from the control portion 50 to the rear right window driving portion 43 and the rear left window driving portion 44. In accordance with the instruction of the control portion 50, the rear right seat window driving portion 43 and the rear left seat window driving portion 44 are driven to move the rear right seat window glass 23 and the rear left seat window glass 24.

In this manner, the movements of the rear right seat window glass 23 and the rear left seat window glass 24 are started after at least one second has passed since the start of the movement of the assistant driver's seat window glass 22. Accordingly, it is possible to improve passenger's safety and it is possible to shift the timings of the overcurrent flowing during motor lock in the window driving portions 42, 43 and 44.

As described above, when the two (left and right) seat window switches in the front row (i.e. the driver's seat window switch 31a and the assistant driver's seat window switch 31b) or the two (left and right) seat window switches in the rear row (i.e. the rear right seat window switch 31c and the rear left seat window switch 31d) are operated concurrently twice continuously, all the window glasses 21, 22, 23 and 24 are moved and opened or closed. It is therefore not a troublesome work (operation) to the driver who is driving.

In addition, the speed of the movement of each window glass 21, 22, 23 or 24 caused by the special operation on the driver's seat power window switch 31 is made slower than the speed of the movement of the window glass 21, 22, 23 or 24 caused by the normal operation on the power window switch 31, 32, 33 or 34. Thus, it is possible to improve passenger's safety.

In addition, the speed of the movement of the driver's seat window glass 21 caused by the special operation on the driver's seat power window switch 31 is made faster than the speed of the movement of any other window glass 22, 23 or 24. Thus, it is possible to reduce troublesomeness imposed on the driver due to slow movement of the driver's seat window glass 21 while securing passenger's safety.

What is claimed is:

1. A power window device for opening and closing a plurality of window glasses of a vehicle, comprising:
   a driving unit which moves the plurality of window glasses, the driving unit including a plurality of drivers that opens and closes each of the plurality of windows;
   an operation unit which has a plurality of switches corresponding to the plurality of window glasses and which is provided for driving the driving unit; and
   a control unit which controls the driving unit to move and open or close the window glasses in accordance with an operation on the operation unit,
   wherein when a normal operation for operating any one of the plurality of window switches individually is performed, the control unit controls the driving unit to move only the window glass corresponding to the operated window switch, and
   when a special operation which is different from the normal operation is performed on the window switches, the control unit controls the driving unit to move all the window glasses,
   wherein upon detection of the special operation, the control unit is programmed to:
   control the plurality of drivers so that a movement speed of each of the window glasses caused by the special operation is slower than a movement speed of the window glass caused by the normal operation.

2. The power window device according to claim 1, wherein the control unit is programmed to control the plurality of drivers so that a movement speed of the window glass disposed on a driver's seat side of the vehicle is faster than a movement speed of the window glass disposed on seat sides other than the driver's seat side of the vehicle during the movements of the window glasses caused by the special operation.

3. The power window device according to claim 1, wherein the control unit is programmed to control the plurality of drivers so that a movement speed of each of the window glasses caused by the special operation is slower than a movement speed of the window glass caused by the normal operation, and
   the control unit is programmed to control the plurality of drivers so that a movement speed of the window glass disposed on a driver's seat side of the vehicle is faster than a movement speed of the window glass disposed on seat sides other than the driver's seat side of the vehicle during the movements of the window glasses caused by the special operation.

4. The power window device according to claim 1, wherein the control unit is programmed to control the plurality of drivers to move the window glasses at different movement timings when the special operation different from the normal operation is performed on the window switches to move all the window glasses.

5. The power window device according to claim 4, wherein the control unit is programmed to control the plurality of drivers so that the movements of the window glasses are stopped at different timings during the movements of the window glasses caused by the special operation.

6. The power window device according to claim 5, wherein the control unit is programmed to control the plurality of drivers to start moving the window glasses disposed in a front row of the vehicle and then start moving the window glasses disposed in a rear row of the vehicle so that the movements of the window glasses is started at different movement timings during the movements of the window glasses caused by the special operation.

7. The power window device according to claim 6, wherein the control unit is programmed to control the plurality of drivers to start moving the window glass disposed on a driver's seat side in a front row of the vehicle and then start moving the window glass disposed on an assistant driver's seat side in the front row of the vehicle so that the movements of the window glasses is started at different movement timings during the movements of the window glasses caused by the special operation.

8. The power window device according to claim 7, wherein the control unit is programmed to control the plurality of drivers so that a time between start of the movement of the window glass disposed on a driver's seat side in a front row of the vehicle and start of the movement of the window glass disposed on an assistant driver's seat side in the front row of the vehicle is longer than a time between the start of the movement of the window glass disposed on the assistant driver's seat side in the front row of the vehicle and start of the movements of the window glasses disposed in a rear row of the vehicle during the movements of the window glasses caused by the special operation.

9. The power window device according to claim 4, wherein the control unit is programmed to control the plurality of drivers to start moving the window glasses disposed in a front row of the vehicle and then start moving the window glasses disposed in a rear row of the vehicle so that the movements of the window glasses is started at different movement timings during the movements of the window glasses caused by the special operation.

10. The power window device according to claim 9, wherein the control unit is programmed to control the plurality of drivers to start moving the window glass disposed on a driver's seat side in a front row of the vehicle and then start moving the window glass disposed on an assistant driver's seat side in the front row of the vehicle so that the movements of the window glasses is started at different movement timings during the movements of the window glasses caused by the special operation.

11. The power window device according to claim 10, wherein the control unit is programmed to control the plurality of drivers so that a time between start of the movement of the window glass disposed on a driver's seat side in a front row of the vehicle and start of the movement of the window glass disposed on an assistant driver's seat side in the front row of the vehicle is longer than a time between the start of the movement of the window glass disposed on the assistant driver's seat side in the front row of the vehicle and start of the movements of the window glasses disposed in a rear row of the vehicle during the movements of the window glasses caused by the special operation.

12. The power window device according to claim 9, wherein the control unit is programmed to control the plurality of drivers so that a time between start of the movement of the window glass disposed on a driver's seat side in a front row of the vehicle and start of the movement of the window glass disposed on an assistant driver's seat side in the front row of the vehicle is longer than a time between the start of the movement of the window glass disposed on the assistant driver's seat side in the front row of the vehicle and start of the movements of the window glasses disposed in a rear row of the vehicle during the movements of the window glasses caused by the special operation.

13. The power window device according to claim 4, wherein the control unit is programmed to control the plurality of drivers to start moving the window glass disposed on a driver's seat side in a front row of the vehicle and then start moving the window glass disposed on an assistant driver's seat side in the front row of the vehicle so that the movements of the window glasses is started at different movement timings during the movements of the window glasses caused by the special operation.

14. The power window device according to claim 4, wherein the control unit is programmed to control the plurality of drivers so that a time between start of the movement of the window glass disposed on a driver's seat side in a front row of the vehicle and start of the movement of the window glass disposed on an assistant driver's seat side in the front row of the vehicle is longer than a time between the start of the movement of the window glass disposed on the assistant driver's seat side in the front row of the vehicle and start of the movements of the window glasses disposed in a rear row of the vehicle during the movements of the window glasses caused by the special operation.

15. The power window device according to claim 13, wherein the control unit is programmed to control the plurality of drivers so that a time between start of the movement of the window glass disposed on a driver's seat side in a front row of the vehicle and start of the movement of the window glass disposed on an assistant driver's seat side in the front row of the vehicle is longer than a time between the start of the movement of the window glass disposed on the assistant driver's seat side in the front row of the vehicle and start of the movements of the window glasses disposed in a rear row of the vehicle during the movements of the window glasses caused by the special operation.

16. The power window device according to claim 5, wherein the control unit is programmed to control the plurality of drivers to start moving the window glass disposed on a driver's seat side in a front row of the vehicle and then start moving the window glass disposed on an assistant driver's seat side in the front row of the vehicle so that the movements of the window glasses is started at different movement timings during the movements of the window glasses caused by the special operation.

17. The power window device according to claim 5, wherein the control unit is programmed to control the plurality of drivers so that a time between start of the movement of the window glass disposed on a driver's seat side in a front row of the vehicle and start of the movement of the window glass disposed on an assistant driver's seat side in the front row of the vehicle is longer than a time between the start of the movement of the window glass disposed on the assistant driver's seat side in the front row of the vehicle and start of the movements of the window glasses disposed in a rear row of the vehicle during the movements of the window glasses caused by the special operation.

18. The power window device according to claim 16, wherein the control unit is programmed to control the plurality of drivers so that a time between start of the movement of the window glass disposed on a driver's seat side in a front row of the vehicle and start of the movement of the window glass disposed on an assistant driver's seat side in the front row of the vehicle is longer than a time between the start of the movement of the window glass disposed on the assistant driver's seat side in the front row of the vehicle and start of the movements of the window glasses disposed in a rear row of the vehicle during the movements of the window glasses caused by the special operation.

19. The power window device according to claim 6, wherein the control unit is programmed to control the plurality of drivers so that a time between start of the movement of the window glass disposed on a driver's seat side in a front row of the vehicle and start of the movement of the window glass disposed on an assistant driver's seat side in the front row of the vehicle is longer than a time between the start of the movement of the window glass disposed on the assistant driver's seat side in the front row of the vehicle and start of the movements of the window glasses disposed in a rear row of the vehicle during the movements of the window glasses caused by the special operation.

* * * * *